United States Patent [19]

Madoglio et al.

[11] Patent Number: 5,518,448
[45] Date of Patent: May 21, 1996

[54] AIR CONDITIONING DUCT FOR RAILWAY VEHICLES

[75] Inventors: Lino Madoglio, Mercallo dei Sassi; Benedetto Rossini, Rho, both of Italy

[73] Assignee: Fiat Ferroviaria S.p.A., Turin, Italy

[21] Appl. No.: 285,691

[22] Filed: Aug. 4, 1994

[51] Int. Cl.⁶ ................................. B61D 27/00
[52] U.S. Cl. .................. 454/108; 454/137; 454/906
[58] Field of Search ............................... 454/76, 87, 108, 454/112, 137, 287, 903, 906

[56] References Cited

U.S. PATENT DOCUMENTS

| | | | |
|---|---|---|---|
| 1,091,733 | 3/1914 | Cook | 454/112 X |
| 1,537,587 | 5/1925 | Colombo et al. | 454/108 |
| 1,997,387 | 4/1935 | McCord | 454/305 X |
| 4,109,563 | 8/1978 | Schleicher | 454/108 |
| 4,300,441 | 11/1981 | Dicks | 454/287 |

FOREIGN PATENT DOCUMENTS 2124751  2/1984  United Kingdom ............ 454/137

*Primary Examiner*—Harold Joyce
*Attorney, Agent, or Firm*—Sughrue, Mion, Zinn, Macpeak & Seas

[57] ABSTRACT

A duct (1) for the distribution of air conditioning from an air treating apparatus (4) into the inner environment (A) of a railway vehicle (C), comprising an inner tube (2) having radial air outlet holes (5) and an outer tube (3) containing the inner tube (2) and formed with air outlet apertures (6), facing towards the inner environment (A) of the vehicle (C) and arranged in opposite positions with respect to the radial holes (5) of the inner tube (2).

10 Claims, 2 Drawing Sheets

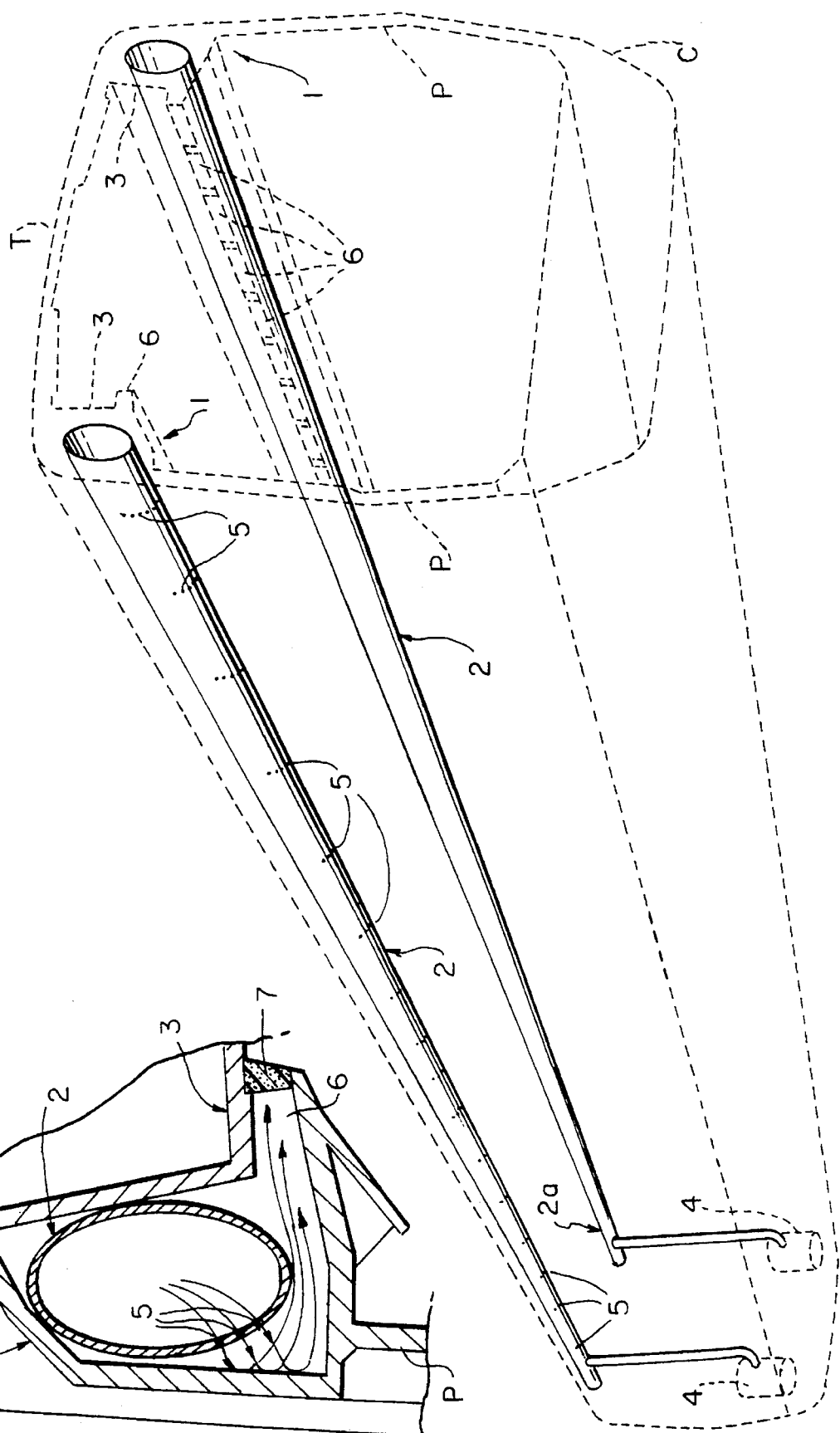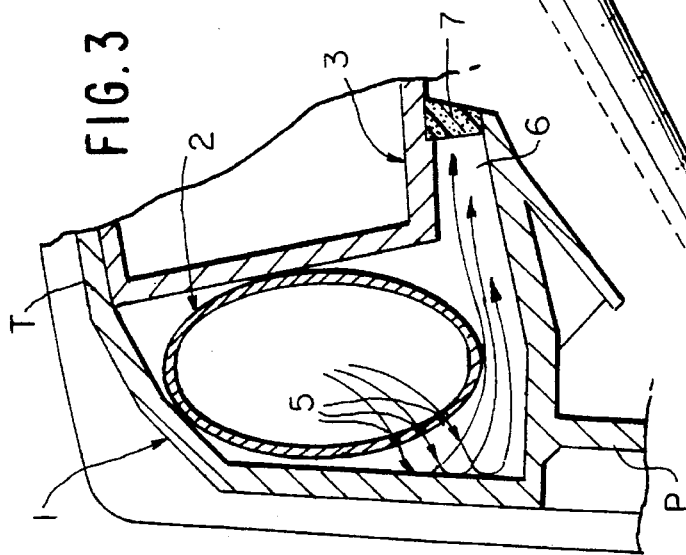

“5,518,448”

AIR CONDITIONING DUCT FOR RAILWAY VEHICLES

BACKGROUND OF THE INVENTION

The present invention is related to the ducts for the distribution of treated air (cooled or heated and even conditioned in terms of humidity, dust, smell etc.) from suitable air treating devices into the inner environment (compartments, pullmans etc.) of a railway vehicle within which the air has to be propagated.

Traditionally the ducts of the above-referenced type are constituted by tubes having a quadrangular cross section with outlet slits distributed over the length thereof, and provided with insulated walls so as to deaden the noise generated by the air flow under pressure, and further with inner baffles and/or shutters associated to the slits, the design of which is laboriously determined by means of empiric methods to the aim of correcting the effects deriving from the reduction of air pressure and speed between the initial and the final ends of the duct.

These ducts involve several inconveniences: firstly they have a relevant encumbrance, since the local flow rate of the air therewithin is directly bound to the air rate of flow delivered by the treatment apparatus and, therefore, the cross section thereof must be such as to guarantee a sufficiently low air speed. Secondly these known ducts are of a complicated construction, owing to the presence of the respective baffles and shutters. Lastly, in spite of the presence of these elements, these known ducts do not enable obtaining a uniform distribution of the air flow to the successive areas of the inner environment of the vehicle, and moreover this flow originates an annoying noise due to the outlet speed of the air through the slits of the duct.

SUMMARY OF THE INVENTION

The object of the present invention is to overcome the above drawbacks, and this object is achieved by virtue of a duct for the distribution of air conditioning of the type set forth at the beginning, the primary feature of which resides in the fact that it comprises:

an inner tube having one end section connected to said air treatment apparatus and having a closed opposite end, said inner tube being provided with radial air outlet holes distributed as a function of the local pressure of the air supplied from said treatment apparatus, and an outer tube, within which said inner tube is housed, said an outer tube formed with air outlet apertures facing towards the inner environment of the vehicle.

According to a preferred embodiment of the invention, the radial holes of the inner tube and the outlet apertures of the outer tube are placed in a mutually opposed configuration.

The radial holes of the inner tube are conveniently locally thickened starting from the area thereof near to said end section connected to the treatment apparatus towards the opposite end thereof.

According to another feature of the invention said apertures of the outer tube are constituted by slits with associated inserts permeable to the air, which may be constituted for instance by wire gauzes, or by micro-pierced plates, or by open cell sponge elements.

The outer tube may be maintained in a slight overpressure with respect to the surrounding environment, and the inner tube may conveniently be made of elastomeric material or the like and has preferably, but not necessarily, a substantially circular or elliptical cross section.

By virtue of this idea of solution a series of remarkable advantages are achieved with respect to the prior art ducts, such as summarized in the following:

constructive simplification, since the radial holes of the inner tube can be easily made by machine tools and replace the baffles and shutters according to the prior art;

reduction of size: the air pressure and air speed within the inner tube can be much higher than in the conventional constructions, while same are anyhow limited within the outer tube since the local air rate of flow is not related to the rate of flow generated by the source (treatment apparatus);

simplified setup: all the constructive data can be foreseen during the design stage with the best approximation and the experimental work is thus reduced to mere checking;

comfort optimization: the air can be supplied into the vehicle environment under a negligible speed and, therefore, without noise. The outer tube performs in this connection the function of a plenum chamber and silencer, and the mutually opposed arrangement of the radial holes of the inner tube and the outlet apertures of the outer tube imposes the air to reach the latter with a negligible speed, the noise being absorbed by repeated reflections of the air against the walls of the two tubes.

BRIEF DESCRIPTION OF THE DRAWINGS

Further features and advantages of the invention will become apparent from the following detailed description, with reference to the annexed drawings purely provided by way of non limiting example, in which:

FIG. 2 is a partial and diagrammatic perspective view of FIG. 1, and FIG. 3 shows in an enlarged scale the detail indicated by arrow III in FIG. 1.

DETAILED DESCRIPTION OF THE INVENTION

Figure 1:
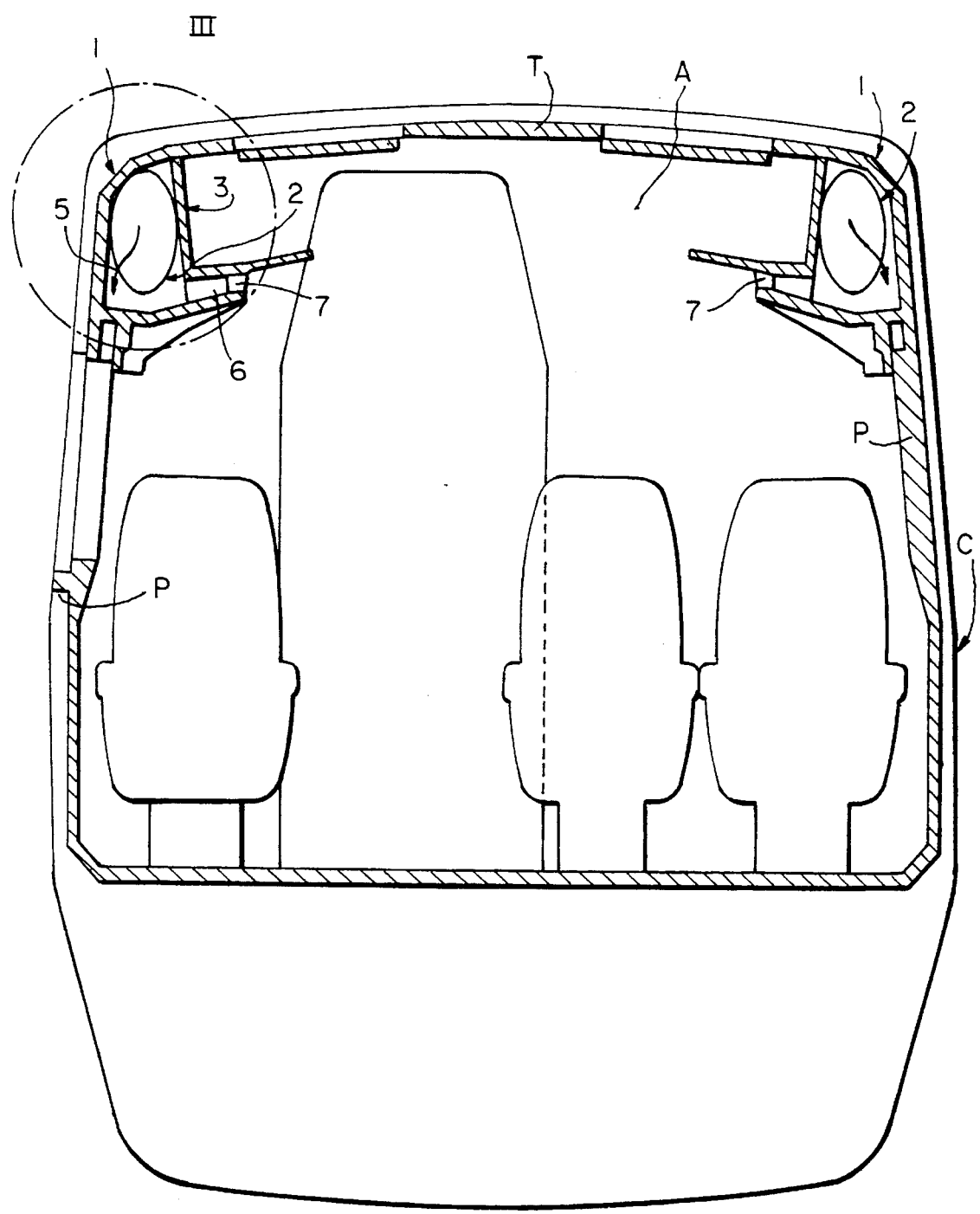
FIG. 1 is a diagrammatic vertically sectioned view of a railway vehicle provided with ducts for the distribution of air conditioning according to the invention.

Referring to the drawings, reference C generally designates the body of a railway vehicle the structure of which delimits an environment A for the passengers, formed by a continuous saloon or by a series of compartments, within which treated air, i.e. cooled or heated or possibly conditioned in terms of humidity, dust, smells etc., has to be uniformly propagated.

For the distribution of the treated air two ducts are provided, which are generally indicated as 1, arranged along the areas of connection between the lateral walls P and the roof T of the body C.

According to the invention, each of the two ducts 1, both spanning longitudinally substantially along the entire length of the body C, comprises an inner tube 2 housed within an outer tube 3.

The inner tube 2 is conveniently formed with an elliptical cross section having its longer axis vertically arranged, and is preferably but not necessarily made of an elastomeric material.

This inner tube 2 has an end section 2a connected in a conventional way to a treatment device or assembly 4, also of a conventional type, and is closed at its opposite end. The inner tube 2 is provided at intervals with outlet holes 5 the distribution of which is determined as a function of the local pressure of the air supplied by the treatment apparatus 4. In other words, the number of these radial holes 5 increases starting from the end section 2a towards the opposite end thereof, for instance such as diagrammatically shown in FIG. 2.

Moreover the outlet holes 5 are arranged so as to address the air flow in the direction of the lateral walls P of the body C, or in any case against the inner wall of the outer tube 3.

This outer tube 3, which may be conveniently integrated with the structure of the body C itself, is provided at regular intervals, or even continuously, with apertures 6 facing towards the interior of the environment A, and in any case with an arrangement which is such as to substantially avoid direct impingement thereagainst of the air flow coming out from the radial holes 5 of the inner tube 2. Accordingly, due to the mutual disposition of the radial holes 5 and apertures 6, the air supplied under pressure from the treatment apparatus 4 into the inner tube 2 reaches the apertures 6, and then the environment A, following repeated reflections against the outer wall of the tube 2 and the inner wall of the tube 3, the latter performing the function both of a plenum chamber and of a soundproofing silencer. The air flow is thus supplied into the environment A under a negligible speed and with a drastically reduced noise.

The apertures 6 of the inner tube 3 are conveniently constituted by elongated slits, in correspondence of the outlet mouths of which inserts 7 permeable to the air are fitted, which are constituted by example by wire gauzes or micro-pierced plates, or more conveniently by open cell sponges.

In order to further enhance the functional efficiency of the duct 1, the outer tube 3 can be maintained under a slight overpressure with respect to the environment A, through any suitable means not shown in the drawings but within the ordinary knowledge of the man skilled in the art.

It will be apparent from the foregoing that the duct according to the invention is extremely simple from the construction and assembling point of view, particularly in case the outer tube 3 is integrated with the structure of the body C. In fact, in such a case assembling is simply performed by introducing and positioning the inner tube 2, with the respective radial holes 5 formed in a simple and economical way, inside the outer tube 3, and then carrying out the connection with the air treatment apparatus.

In operation, the pressure and the speed of the air within the inner tube 2 can be even much higher than according to the standard values of the prior art, since they are anyway reduced within the inner tube 3, thus making the local air rate of flow through the openings 6 independent of the rate of flow generated by the treating apparatus.

Naturally, the details of construction and the embodiments may be widely varied with respect to what has been disclosed and illustrated, without thereby departing from the scope of the present invention, such as defined in the appended claims.

What we claim is:

1. A duct for the distribution of air conditioning from an air treating apparatus to the inner environment of a railway vehicle, comprising:

an inner tube of elastomeric material having one end section connected to said air treatment apparatus and having a closed opposite end, said inner tube being provided with a plurality of radial air outlet holes distributed as a function of local pressure of the air supplied from said treatment apparatus, and an outer tube within which said inner tube is housed, said outer tube being formed with air outlet apertures facing towards the inner environment of the vehicle, wherein the radial holes of said inner tube and the outlet apertures of the outer tube are arranged in a mutually opposed configuration to substantially avoid direct flow of air from the radial holes of the inner tube through the air outlet apertures in the outer tube, said apertures in said outer tube being constituted by slits each having an air permeable insert disposed therein, and wherein the number of radial air outlet holes increase in number from said one end section connected to said air treatment apparatus toward said closed opposite end.

2. A duct as set forth in claim 1, wherein said inner tube has a curvilinear cross-section.

3. Duct according to claim 1, wherein said inserts are constituted by wire gauzes.

4. Duct according to claim 1, wherein said inserts are constituted by micro-pierced plates.

5. Duct according to claim 1, wherein said inserts are constituted by open cell sponges.

6. A railway vehicle having a body structure defining an interior environment and comprising an air treating apparatus and at least one duct for the distribution of air from said air treating apparatus to said environment, said duct comprising:

an inner tube of elastomeric material having one end section connected to said air treatment apparatus and having a closed opposite end, said inner tube being provided with a plurality of radial air outlet holes distributed as a function of local pressure of the air supplied from said treatment apparatus, and an outer tube within which said inner tube is housed, said outer tube being formed with air outlet apertures facing towards the inner environment of the vehicle, wherein the radial holes of said inner tube and the outlet apertures of the outer tube are arranged in a mutually opposed configuration to substantially avoid direct flow of air from the radial holes of the inner tube through the air outlet apertures in the outer tube, said apertures in said outer tube being constituted by slits each having an air permeable insert disposed therein, and wherein the number of radial air outlet holes increase in number from said one end section connected to said air treatment apparatus toward said closed opposite end.

7. A railway vehicle as set forth in claim 3, wherein the inner tube has a curvilinear cross-section.

8. Duct according to claim 6, wherein said inserts are constituted by wire gauzes.

9. Duct according to claim 6, wherein said inserts are constituted by micro-pierced plates.

10. Duct according to claim 6, wherein said inserts are constituted by open cell sponges.

* * * * *